US008768549B2

(12) United States Patent  (10) Patent No.: US 8,768,549 B2
Erko et al.  (45) Date of Patent: Jul. 1, 2014

(54) BATTERY MAINTENANCE SYSTEM

(75) Inventors: Robert J. Erko, Apple Valley, MN (US); Paul L. Groschen, White Bear Lake, MN (US)

(73) Assignee: Tennant Company, Minneapolis, MN (US)

( * ) Notice: Subject to any disclaimer, the term of this patent is extended or adjusted under 35 U.S.C. 154(b) by 0 days.

(21) Appl. No.: 13/289,739

(22) Filed: Nov. 4, 2011

(65) Prior Publication Data

US 2013/0116868 A1  May 9, 2013

(51) Int. Cl.
*B60L 9/00* (2006.01)
*G01M 17/00* (2006.01)
*H02J 7/00* (2006.01)
*H02J 7/04* (2006.01)

(52) U.S. Cl.
USPC ............. 701/22; 701/29.5; 320/135; 320/140

(58) Field of Classification Search
USPC .............................. 701/22, 29.5; 320/135, 140
See application file for complete search history.

(56) References Cited

U.S. PATENT DOCUMENTS

| 5,510,202 | A | * | 4/1996 | McCoy ........................ 429/418 |
| 5,565,755 | A | | 10/1996 | Keith |
| 5,568,037 | A | | 10/1996 | Massaroni et al. |
| 5,659,240 | A | | 8/1997 | King |
| 6,072,299 | A | | 6/2000 | Kurle et al. |
| 6,084,523 | A | | 7/2000 | Gelnovatch et al. |
| 6,091,228 | A | | 7/2000 | Chady et al. |
| 6,198,250 | B1 | * | 3/2001 | Gartstein et al. ............. 320/112 |
| 6,337,560 | B1 | | 1/2002 | Kalogeropoulos et al. |
| 6,577,104 | B2 | | 6/2003 | Sakakibara |
| 6,768,287 | B2 | | 7/2004 | Oosaki |
| 6,771,047 | B1 | | 8/2004 | Ogonowsky |
| 6,911,804 | B2 | | 6/2005 | Mori |
| 6,980,912 | B2 | | 12/2005 | Patino et al. |
| 7,003,431 | B2 | | 2/2006 | Quint |
| 7,191,077 | B2 | * | 3/2007 | Mese et al. ...................... 702/63 |
| 7,282,891 | B2 | | 10/2007 | Smallwood et al. |
| 7,358,701 | B2 | | 4/2008 | Field et al. |
| 7,375,492 | B2 | * | 5/2008 | Calhoon et al. ............... 320/108 |
| 7,489,110 | B2 | * | 2/2009 | Stanesti et al. ................ 320/135 |
| 7,570,015 | B2 | * | 8/2009 | Bansal et al. ................. 320/106 |
| 7,778,746 | B2 | * | 8/2010 | McLeod et al. ................. 701/22 |
| 7,808,210 | B2 | * | 10/2010 | Darilek ........................ 320/132 |
| 7,888,913 | B1 | | 2/2011 | Marty et al. |
| 8,232,875 | B2 | * | 7/2012 | Uchida ........................ 340/455 |

(Continued)

FOREIGN PATENT DOCUMENTS

WO  2010013212 A1  2/2010

OTHER PUBLICATIONS

International Search Report for Applic. No. PCT/US2013/024599, date of mailing Oct. 17, 2013, 15 pages.

*Primary Examiner* — Thomas Black
*Assistant Examiner* — Tyler Paige
(74) *Attorney, Agent, or Firm* — Fredrikson & Byron, P.A.

(57) ABSTRACT

A battery-powered vehicle and a vehicle battery maintenance system that includes a battery charger that monitors energy consumption data from the vehicle battery to generate charging instructions to a charger. A central data unit (CDU) can determine whether if a vehicle electrical load is consuming too much energy and then generate instructions to the vehicle controller to limit the energy consumption. The CDU can notify an offsite central computer if the battery has not been charged according to charging instructions.

21 Claims, 3 Drawing Sheets

(56) References Cited

U.S. PATENT DOCUMENTS

| | | | |
|---|---|---|---|
| 8,319,471 B2 * | 11/2012 | Adest et al. | 320/103 |
| 2002/0101218 A1 * | 8/2002 | Koenck et al. | 320/140 |
| 2005/0248313 A1 * | 11/2005 | Thorland | 320/130 |
| 2006/0089733 A1 | 4/2006 | Dickinson | |
| 2006/0208570 A1 * | 9/2006 | Christian et al. | 307/10.1 |
| 2009/0066291 A1 * | 3/2009 | Tien et al. | 320/118 |
| 2010/0076825 A1 | 3/2010 | Sato | |
| 2010/0114798 A1 | 5/2010 | Sirton | |
| 2010/0123436 A1 * | 5/2010 | Herrod et al. | 320/132 |
| 2010/0250043 A1 * | 9/2010 | Scheucher | 701/22 |
| 2011/0025258 A1 | 2/2011 | Kim et al. | |
| 2011/0040440 A1 * | 2/2011 | de Oliveira et al. | 701/30 |
| 2011/0246252 A1 | 10/2011 | Uesugi | |

* cited by examiner

BATTERY MAINTENANCE SYSTEM

FIELD

The present invention relates to a battery maintenance system for battery-powered vehicles.

BACKGROUND

Battery-powered vehicles are often used by businesses. Common industrial vehicles include materials handling vehicles (such as lifting or pallet vehicles), cleaning vehicles (such as scrubbing or sweeping vehicles) and even recreational vehicles (such as golf carts). Sometimes battery-powered vehicles are used in fleets, wherein a large number of vehicles are maintained by a single business. Also, sometimes vehicles within the single fleet have different rechargeable battery technologies (such as lead-acid, lithium-ion, sealed, flooded or deep cycle batteries).

Different battery technologies use different charging methodologies or algorithms. Battery chargers are provided that are designed to charge a specific type of battery. As such, several different battery chargers are often needed to charge different vehicles within a fleet. This can be cumbersome and lead to operator errors. For example, an operator typically uses the battery-powered vehicle to complete a task and thereafter connects the vehicle battery to a specified battery charger. However, sometimes an operator forgets to connect the battery to its charger or even connects the battery to a wrong charger type or to a malfunctioning charger. Operators might also interrupt the charge prematurely, resulting in undercharging. Or, a charger may misjudge the amount of energy required to fully recharge the battery, possibly resulting in an overcharge or undercharged battery. Such errors obviously negatively impact the life of the vehicle battery. Additionally, operators need to invest time in battery maintenance.

As one might expect, battery replacement on battery-powered vehicles is very expensive. To the extent one can protect and extend the life of a battery, the cost savings can be significant. Additionally, it is desirable to reduce the amount of maintenance an operator needs to spend on vehicle batteries.

SUMMARY

Certain embodiments of the invention include a battery powered vehicle with a vehicle battery, a battery charger, a vehicle electrical load, and a central data unit (CDU). The battery charger is capable of charging batteries of differing chemistries, the CDU is in communication with the battery, the charger, and the electrical load. The CDU receives battery identification data, including the chemistry type of the battery. The CDU also receives energy consumption data from the battery and uses the battery identification data and energy consumption data to generate charging instructions for the charger, and outputs the charging instructions to the battery charger.

Some embodiments of the invention provide a vehicle battery maintenance system that includes a battery charger, and a central data unit (CDU), where the CDU is in communication with the charger and is configured to gather data from an existing vehicle battery and an existing vehicle electrical load. The CDU also collects energy consumption data from the battery, maintains a clock and a calendar, and creates an energy consumption profile for the vehicle. The CDU creates the profile by tracking the energy consumption data over a period of vehicle use, the timing of the use, and the date of the vehicle use. The CDU predicts the amount of energy needed by the battery during a subsequent vehicle use based on the profile. The CDU uses the energy consumption data and the prediction in order to generate charging instructions for the charger. The CDU also outputs the charging instructions to the charger.

Some embodiments of the invention include a battery-powered vehicle that generates instructions to a controller of the vehicle in order to limit the energy consumption by the vehicle electrical load if the vehicle electrical load is consuming too much energy. Some embodiments of the invention provide a vehicle battery maintenance system where the CDU notifies an offsite central computer if the battery has not been charged following the charging instructions. Some embodiments of the invention provide a vehicle battery maintenance system where the CDU or the offsite central computer determine the charge capacity remaining in the vehicle battery based on energy consumption data and the charging instructions.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

Figure 1:
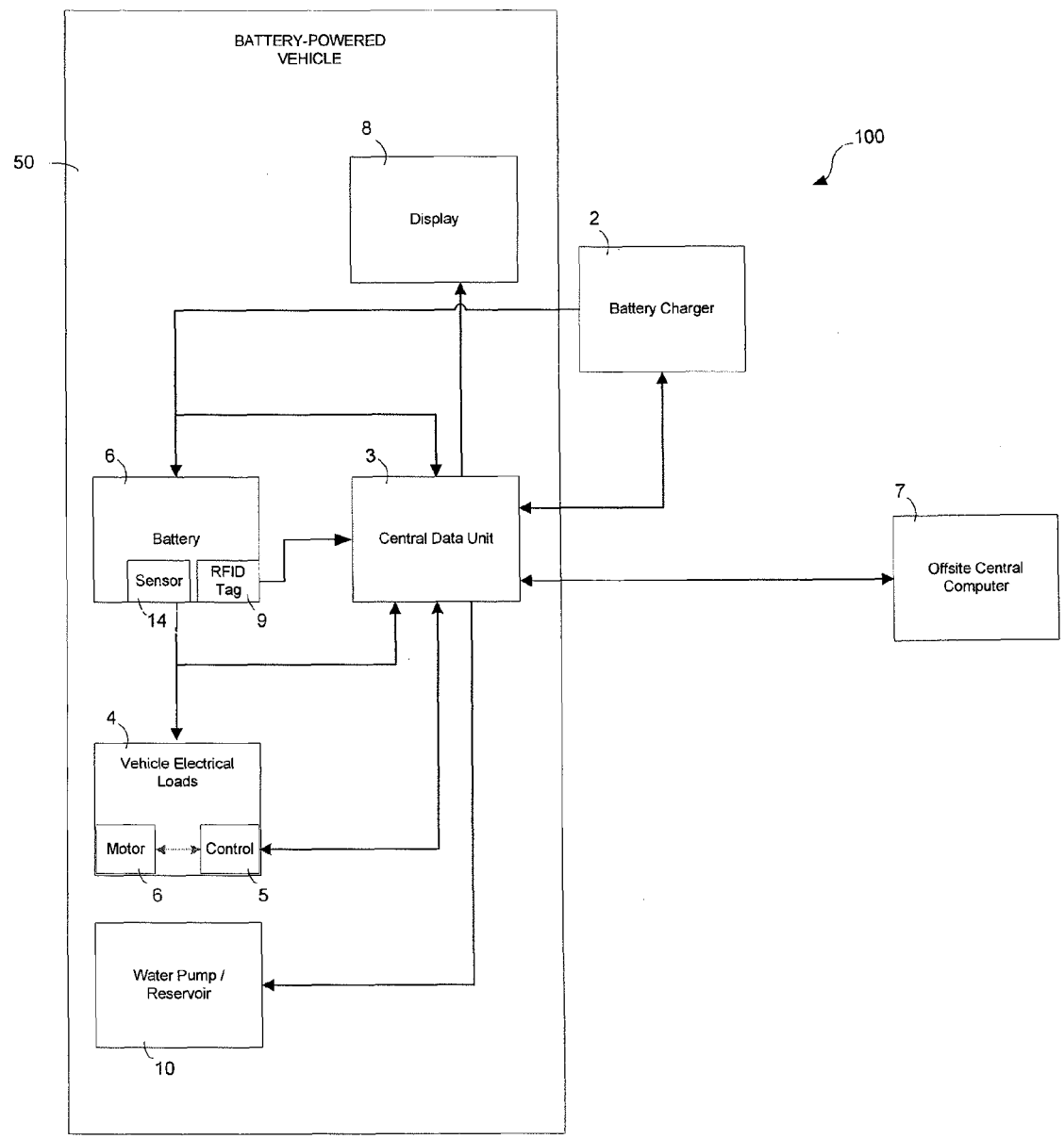
FIG. 1 is a component level block diagram of a battery-powered vehicle having a battery maintenance system according to some embodiments of the invention.

For the purpose of promoting an understanding of the principles of the invention, reference will now be made to the embodiments illustrated in the drawing and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art to which the invention relates.

An intelligent battery maintenance system 100 for battery-powered vehicles is provided. FIG. 1 illustrates a battery maintenance system 100 in accordance with certain embodiments. The system 100 includes a battery-powered vehicle 50. The vehicle 50 can be any battery-powered vehicle known in the art. In certain cases, the vehicle 50 is part of a fleet of vehicles. The vehicle 50 can also be a vehicle that is used at consistent periodic intervals approximating a relatively consistent usage pattern (e.g., set times everyday, every other day, once a week or even every other week). In certain cases, the vehicle 50 is a commercial vehicle, such as a floor scrubbing vehicle, a floor sweeping vehicle, a vacuuming vehicle, or a combination thereof. The maintenance system 100 includes a battery 1, a central data unit 3, and vehicle electrical loads 4, all located on the vehicle. The electrical loads 4 include several components, such as a motor 6, a motor controller 5, a water pump/reservoir 10, and a vehicle display 8. Also, the battery 1 can include an identifier 9. The charging system 100 also includes an off-board battery charger 2 and a central computer 7. Each of these components will now be described in more detail.

FIG. 1 illustrates the communications between various components in the battery maintenance system 100. The central data unit (CDU) 3 is in communication with the vehicle battery 1, battery charger 2, vehicle controller 5, computer 7, display 8, battery identifier 9 and water pump/reservoir 10. In addition, CDU 3, which can include a real-time clock, connects to the connection between the battery charger 2 and the battery 1 in order to monitor the energy delivered to the battery 1 by battery charger 2. CDU 3 also connects to the connection between the battery 1 and the vehicle electrical loads 4 to monitor the energy drawn from the battery 1 by the vehicle electrical loads 4. The CDU 3 inputs and/or outputs information to each of these components. The CDU 3 can be in communication with these components using a variety of known communication setups, including known wired or wireless communication architectures.

The vehicle battery 1 can include any known rechargeable vehicle battery in the art. In some cases, the battery 1 is a lead-acid battery or a nickel metal hydride (NiMH) battery. In other cases, the battery 1 is lithium-ion (Li-ion) battery. The battery 1 also includes an identifier 9. The identifier 9 stores information about the battery 1. In some cases, the identifier 9 is an RFID tag that stores battery identification data. Battery identification data may include, but is not limited to, battery type, battery chemistry type, battery serial number, battery manufacture date, battery size, battery technology and the like. The battery 1 is also in communication with the battery charger 2 and the vehicle electrical loads 4. In other words, the battery 1 receives energy from the charger 2 and delivers energy to the electrical loads 4. As shown in FIG. 1, the CDU 3 taps in to each of these links between the charger 2 and the battery 1 and between the battery 1 and the electrical loads 4 so that the CDU monitors the energy delivered to the battery and discharged from the battery. The CDU 3 stores this data in the form of energy consumption data. In many cases, the CDU 3 continuously receives this data in real time or it samples, for instance the voltage and current out, periodically. By tracking energy consumption data over time, the CDU 3 may then create an energy consumption profile for the vehicle that includes more than just basic energy consumption. An energy consumption profile may include parameters such as average number of Amp-Hours per charge, peak number of Amp-Hours per charge, average voltage of the Battery 1 at the completion of vehicle use, lowest remaining Battery 1 voltage at the completion of vehicle use after a period of several days of use, time of discharge, rate of discharge over time, maximum, minimum, and average period of vehicle use per day, maximum, minimum, and average period of electrical load 4 use (e.g., one or more of the vehicle electrical components) per day, start and end times for usage and charging, days of the week or the month for vehicle usage and charging, and the like. In embodiments where the vehicle is a commercial scrubber, one or more of the vehicle electrical components stored in the energy consumption profile may include the vehicle scrubber. Similarly, where the vehicle is a commercial scrubber, one or more of the vehicle electrical components stored in the energy consumption profile may include the vehicle scrubber. Thus, the energy consumption profile, in such cases, may include the maximum, minimum, and average period of use of the vehicle scrubber or the vehicle sweeper. As will be noted below, the energy consumption profile provides an indicator or predictor of future energy consumption that may be used to control the amount of charge to deliver to the battery 1 during recharging.

Thus, CDU 3 receives the battery identification data and the energy consumption data. The vehicle 50 also includes electrical loads 4. In many embodiments, the electrical loads 4 include at least a vehicle controller 5 and a vehicle motor 6. The controller 5 is in connection with and operates the motor 6. The vehicle controller 5 can include any vehicle machine controller known in the art. Likewise, the vehicle motor 6 can include any motor type known in the art that uses electricity. The controller 5 responds to commands from the operator to control the motor 6. For example, the controller 5 can respond to brake commands from a brake actuator or accelerator commands from an accelerator actuator. In certain embodiments of the present invention, the controller 5 also responds to instructions from the CDU 3, as will be explained in more detail below.

The vehicle 50 may also include a display 8. The display 8, which may be considered as another vehicle electric load 4, can be provided anywhere about the vehicle 50. The display 8 can be any display type known in the art such as an LCD display, touch-screen display or other suitable display. The display 8 can also include user-interface buttons to allow an operator to navigate menu options presented thereon. The display 8 displays information related to the vehicle battery 1, for example the percent charged, run time remaining before discharged (based on charge level and rate of discharge monitored by CDU 3), battery type, remaining estimated lifespan of the battery, battery watering information, battery malfunctions, remaining time until battery charging is complete (based on charge level, rate of charge, and desired charge level monitored and calculated by CDU 3) and the like. The display 8 can also display information related to the vehicle operation, for example the on/off status of the vehicle, current vehicle energy consumption information, remaining operating time based on the battery charge level, and the like.

In certain embodiments, the vehicle 50 also includes a water pump/reservoir 10. Certain battery types require watering. For example, lead-acid batteries come in two common types: flooded lead-acid batteries and sealed lead-acid batteries. Flooded lead-acid batteries require watering after use but sealed lead-acid batteries do not. The water pump/reservoir 10 is provided to water the battery 1 if needed. The water pump/reservoir 10 includes a reservoir that contains water and opening for an operator to fill the reservoir with water, among other things.

The battery charger 2 can be either on-board or off-board the vehicle 50. In FIG. 1, the charger 2 is shown off-board. In any event, the battery charger 2 is in communication with the CDU 3. In certain embodiments, the battery charger 2 is a battery charger that is configured to charge several different types of batteries and batteries of different types of chemistries (e.g., lead-acid or Li-ion). The charger 2 is also programmable so that it can receive instructions from the CDU 3 and adjust its charging algorithm and charge profile based on those instructions. The optional offsite central computer 7 is off-board the vehicle but may also be in communication with the CDU 3.

Figure 2:
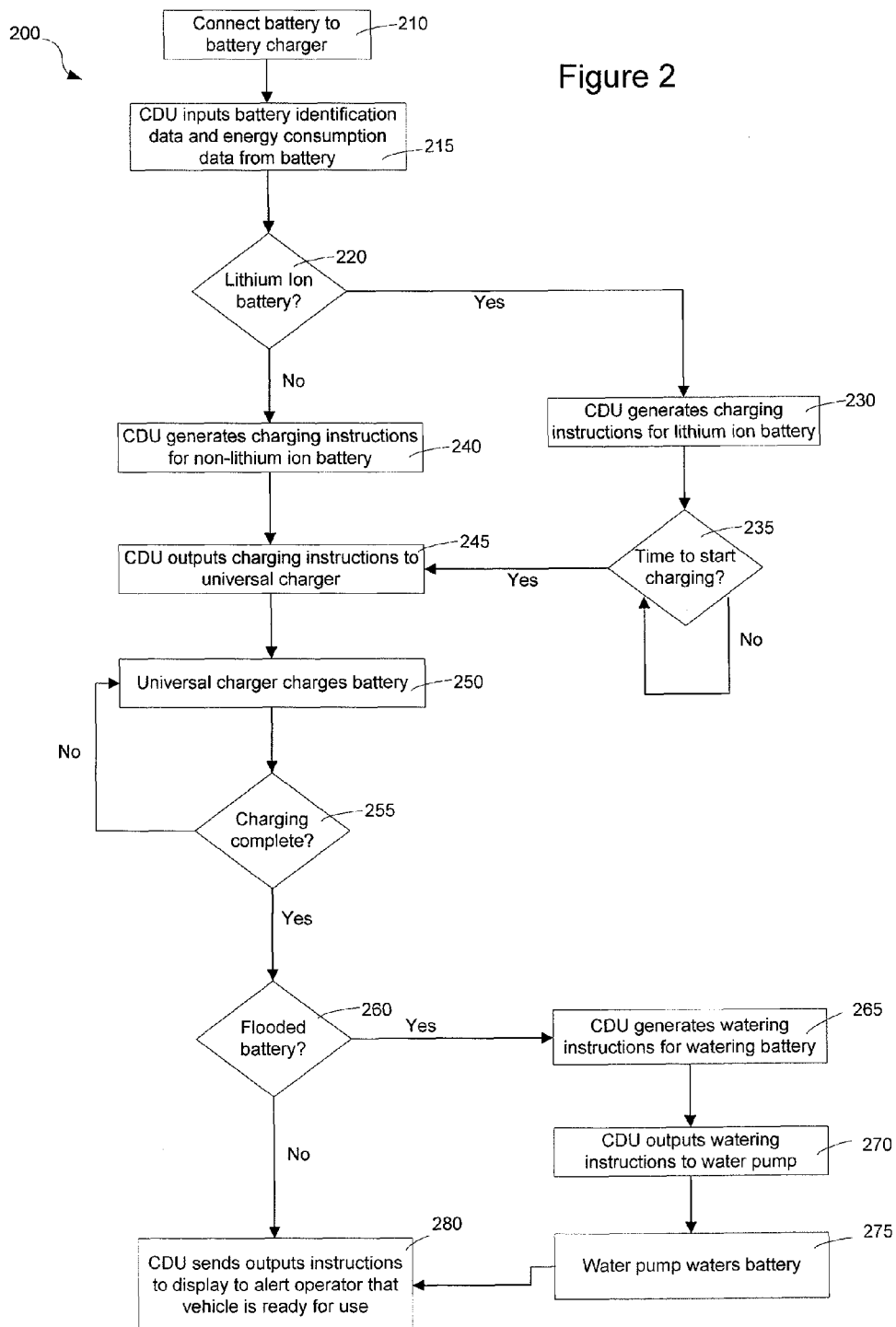
FIG. 2 is a flow chart showing an operation mechanism for the battery maintenance system according to some embodiments of the invention.

The battery maintenance system 100 is designed to extend the useful life of the battery 1 and to reduce the amount of operator maintenance needed. FIG. 2 illustrates an operation mechanism 200 for the system 100 according to certain embodiments. Once an operator is done using the vehicle 50, he or she connects the vehicle battery 1 with the battery charger 2 (step 210). Typically, the vehicle battery 1 is connected to an electrical cord with a plug that can be plugged into the charger 2, although several arrangements of connecting the battery 1 to the battery charger 2 can be used.

This connection automatically prompts the CDU 3 to input battery identification data from the battery identifier 9 and energy consumption data from the connections between the battery 1 and the battery charger 2 and the vehicle electrical loads 4 (step 215). The CDU 3 then uses the inputted data to generate charge instructions for the battery charger 2. The CDU 3 can consider a number of factors when generating charging instructions, which may also be considered as a charging profile, such as battery type, chemistry, manufacture date, size, technology, voltage, charge status, discharge from previous vehicle use, number of charge cycles undergone, date of last battery equalization charge, and the like. The charging instructions can include instructions on the level of charge, rate of charging, time of charging, days of week for charging, and date of charging. The time, days of week, and dates may be tracked by an on-board clock and calendar within CDU 3. In many cases, the charging instructions can also include charging algorithms. Particular charging algorithms are used by different types (e.g., chemistries, manufacturers, models, etc.) of batteries. Thus, the CDU 3 may specify which type of charging algorithms to employ based on the type of battery 1 provided by the identifier 9. In addition, CDU 3 may also specify modifications to the charge algorithms based on recent energy consumption data and/or the energy consumption profile for the battery 1. For instance, if recent energy consumption data indicates that only a small amount of charge has been consumed from battery 1 since its last charge, then CDU 3 may specify to charger 2 to eliminate certain phases from the charge algorithm (e.g., the early phases of the charge algorithm) since a large amount of additional charge is not needed. Such algorithm modification may extend the life of the battery 1 since battery 1 need not endure the entire charge algorithm in order to complete its charging. In this way, not only can CDU 3 instruct the charger 2 of the amount of charge to return to battery 1, but CDU 3 can also instruct charger 2 to specifically modify known charge algorithms based on recent energy consumption data and/or energy consumption profiles developed over time. The charge profile (instructions) are therefore tailored to the energy consumption data or the energy consumption profile, which can extend the useful life of the battery 1. The charging instructions may also include whether to conduct an equalization charge. The on-board clock and calendar can be used to estimate energy need and the calendar can be used to optimize cell balancing.

The CDU 3 may also be in communication with the offsite computer 7. New or updated charging algorithms can be periodically sent from the computer 7 to the CDU 3. For example, new charge algorithms are created, the central computer 7 can send new algorithms to the CDU 3 to consider when generating charging instructions 3. CDU 3 can then upgrade the charger 2 with the new algorithms the next time the charger 2 is connected. In some cases, each time the operator connects the vehicle battery 1 with the battery charger 2 (step 210), the CDU 3 also checks in with the computer 7 to determines whether its charging algorithms need to be updated.

When generating charging instructions (aka charge profile), the CDU 3 also determines whether the battery 1 is a lithium-ion, flooded, or sealed Lead Acid battery (step 220). If the battery 1 is not a lithium-ion battery, the CDU 3 generates charging instructions for the non lithium-ion battery (step 240). In certain cases, the charging instructions for a non lithium-ion battery will simply be instructions to charge the battery 1 to its full charging capacity and to maintain the battery 1 at the full charging capacity until the next vehicle use. However, if the battery 1 is a Li-ion battery, the CDU 3 generates charging instructions for a lithium-ion battery (step 230). The charging instructions for a lithium-ion battery will typically be more complex and is explained in more detail below.

The ability of the CDU 3 to generate different charging instructions for a lithium-ion battery and a non lithium-ion battery is advantageous because maximum life on a typical non lithium-ion battery is achieved if the battery is kept at its full charge whereas a lithium-ion battery is the opposite. A lithium-ion battery has a maximum life when its charge is kept at a minimum level required to complete a task. As such, it is desirable to only charge the battery 1 to the minimum level required to complete a task and also to keep the battery 1 at a reduced charge until it needs to be used.

With previous charging systems, an operator simply connects a vehicle battery to a charger after vehicle use and the battery remains connected to the charger until it is used for a future task. As such, the battery is stored in a fully charged state with little or no load. Under such storage conditions, a lithium-ion battery chemistry degrades. Also, existing charging systems are often designed to recharge the battery as quickly as possible to reduce the amount of time a user may have to wait to use the vehicle again. Charging a lithium-ion battery too quickly raises the temperature of the battery, which may also lead to degradation in battery chemistry. Thus, while past charging mechanisms are often acceptable for a non lithium-ion battery, they are less than ideal for a lithium-ion battery.

With a lithium-ion battery, under certain embodiments of the invention, it is desirable to wait to charge the battery until immediately before vehicle use. As such, in the current system 100, if the CDU 3 determines the battery 1 is a lithium-ion battery (step 220), it also determines when it is desirable to begin charging the battery 1 and prompts the battery charger 2 to begin charging the battery 1 once a set time point occurs (step 235). The CDU 3 uses energy consumption profiles gathered during periods of use to predict future periods of use and non-use of the vehicle and generate a set time point of when to start charging the battery 1 so it is ready for the next vehicle use. In some cases, the CDU 3 tracks previous periods of use, length of use, time of use, days of the week of use and the like when forming an energy consumption profile. For example, some vehicles are used every day, every other day, once a week or even every other week. The CDU 3 uses all of this information to generate a set time point for inclusion in its charge profile that is delivered to the charger 2.

An example will now be described. Say the vehicle 50 is generally used between 1:00 AM and 4:00 AM but is idle for the remainder of the day. Once an operator finishes using the vehicle 50 at 4:00 AM, he or she connects the battery 1 to the battery charger 2. Under traditional charging systems, the charger 2 immediately begins charging the battery 1 until its charging is deemed complete. The charger 2 initiates charging immediately regardless of the battery type. Under certain embodiments of the current system 100, the CDU 3 uses energy consumption profiles developed over a period of time to generate an optimum set time point. If the CDU 3 determines that it takes approximately three hours to charge the battery 1, it may prompt the battery charger 2 to start charging the battery 1 at 9:00 PM—a set time point—so the battery 1 will be finished charging just before the expected usage time. This allows the battery 1 to remain at a lower charge capacity for the remainder of the day—from 4:00 AM to 9:00 PM. Also, when determining an amount of time needed to charge the battery 1, the CDU 3 can also allow sufficient time to assure that the charge rate is slow enough to prevent the battery 1 from reaching a temperature where chemical damage to the battery 1 will occur. The process can occur with no operator or manager input. The operation may be totally transparent to the operator yet can yield significant improvements in battery life.

During periods of non-use, the CDU 3 can also reduce the lithium-ion battery charge to an optimum level for storage. For example, if the CDU 3 determines a long period of inactivity is expected, it may instruct the charger 2 to discharge the battery 1 to the desired level of charge. The CDU 3 can also control the rate of discharge to prevent a discharge rate that causes a rise in the temperature of the battery 1 that would cause chemical damage to the battery 1. Thus, the battery charging system 100 optimizes the useful life of the lithium-ion battery by maintaining the battery charge at a level optimum for storage while having the battery 1 ready for use when required by the operator.

Once the CDU 3 generates charging instructions, it outputs those instructions to the charger 2 (step 245). The charger 2 then charges the battery 1 (step 250) until charging is complete (step 255). During charging, the CDU 3 continues to receive energy consumption data from the battery connections. The CDU 3 can use this data to generate and send instructions to the offsite computer 7 and/or display 8 to display status information on the battery charging, such as the percent of battery charged, remaining time left to complete charging, and the like. The CDU 3 can also use this data to determine whether a fault in the charging occurs. If a fault occurs, the CDU 3 sends instructions to the offsite computer 7 and/or display 8 to alert the operator that a fault has occurred. Such alerts may also include notices that the operator did not remember to charge the battery 1.

The maintenance system 100 also incorporates a battery watering system in some embodiments. After charging is complete, the CDU 3 uses battery identification data (step 215) to determine whether the battery 1 is a flooded battery type that requires watering (step 260). If the battery 1 is not a flooded battery, the CDU 3 outputs instructions to the offsite computer 7 and/or display 8 to alert an operator that the vehicle is ready for use (step 280). If the battery 1 is a flooded battery, the CDU 3 generates watering instructions for watering the battery 1 (step 265) and then outputs those instructions to the water pump/reservoir 10 (step 270). In some cases, the CDU 3 also determines when it is desirable to begin watering the battery 1 and prompts the pump to begin watering the battery 1 once a set time point occurs. The watering instructions can also be provided in the form of profiles. The water pump then waters the battery 1 (step 275). Once watering is complete, the CDU 3 can output instructions to the offsite computer 7 and/or display 8 to alert an operator that the vehicle is ready for use (step 280).

The battery watering system is advantageous because it even further reduces the amount of maintenance an operator needs to perform on the vehicle 50. All an operator needs to do is make sure the water reservoir in the water pump/reservoir 10 is filled with water. The CDU 3 also monitors the water pump/reservoir 10 and determines whether water needs to be added, such as via a water level sensor known in the art. When water is needed, it sends instructions to the computer 7 and/or display 8 to alert the operator that water needs to be added to the water pump/reservoir 10.

Figure 3:
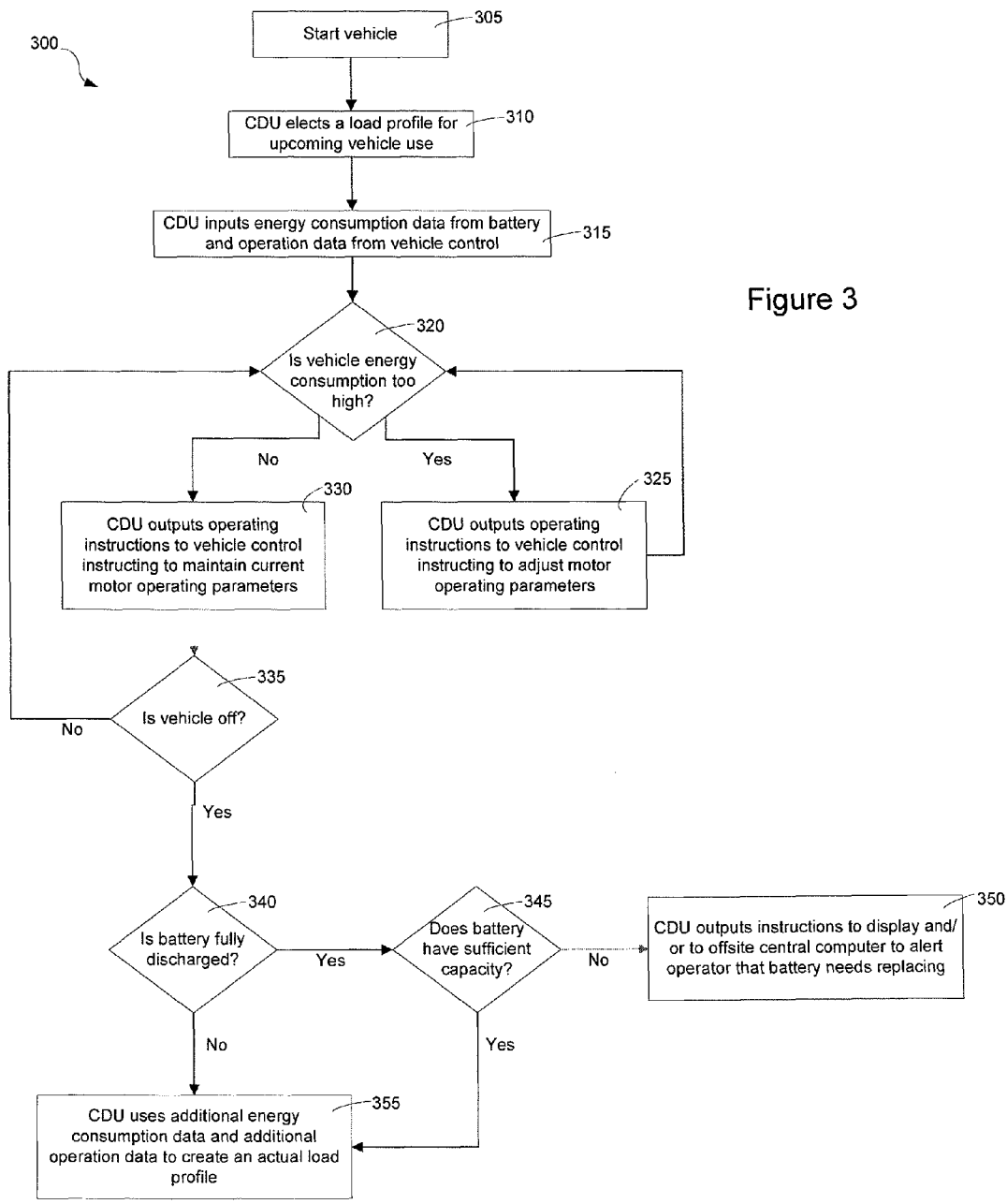
FIG. 3 is a flow chart showing an additional operation mechanism for the battery maintenance system according to some embodiments of the invention.

FIG. 3 illustrates additional methods 300 of operation of the battery maintenance system 100 according to certain embodiments. When an operator desires to use the vehicle 50, he or she turns the vehicle on (step 305). This prompts the CDU 3 to select or load an energy consumption profile for the upcoming vehicle use (step 310). The selected energy consumption profile can be based on an analysis of past energy consumption profiles. For instance, if the vehicle is used at about the same time each day, CDU 3 develops an energy consumption profile for each such expected use and selects an appropriate one based on several factors, including time of day of vehicle use.

As the operator uses the vehicle 50, the CDU 3 continues to receive energy consumption data from the battery connections and operation data from the vehicle controller 5. The energy consumption data can simply be the battery voltage, current and temperature in some cases. The CDU 3 uses this received information to determine whether the present energy consumption is too high for the vehicle to complete its expected use as predicted in the selected energy consumption profile (step 320). If the present energy consumption is too high, the CDU 3 outputs operating instructions to the vehicle controller 5 instructing it to adjust the vehicle operating parameters to reduce battery charge consumption (step 325). The specific vehicle parameter and the adjustment amount may be specified by the CDU 3. The controller 5 then adjusts vehicle parameters to use less power and/or the controller 5 merely throttles down the vehicle parameters until the CDU 3 senses that the energy consumption has dropped to the expected amount or within a threshold level. In some embodiments, the controller chooses which vehicle parameters to throttle down following a list of priorities, from least important vehicle parameters to most important. In the case where the vehicle is a commercial floor scrubber, the energy consumption profile may correspond to an expected down-pressure of the scrubber brush or brushes that produces an expected load. To the extent a user sets the down-pressure at an amount higher than expected or too high for the vehicle to complete its expected task, the CDU 3 may instruct the vehicle controller 5 to decrease the down-pressure to the expected amount or to an amount that will permit the vehicle the complete its expected task without the battery 1 becoming fully discharged.

If the energy consumption is not too high, the CDU 3 outputs operating instructions to the controller 5 instructing it to maintain the current vehicle operating parameters or power levels (step 330). Alternatively, in such a situation, the CDU 3 does not output any instructions to the controller 5. This loop continues until the operator turns the vehicle off or the vehicle shuts off on its own (step 335). This loop is advantageous in cases where a new operator uses a vehicle more aggressively or actively than a previous operator.

Once the vehicle is turned off (step 335), the CDU 3 uses the energy consumption data inputted to determine whether the battery 1 is fully discharged (step 340). If the answer is no, the CDU 3 uses inputted information to create an actual energy consumption profile and archives this profile (step 355). This actual energy consumption profile contains information that enables the CDU 3 to elect future energy consumption profiles (step 310) and to generate charging instructions for the charger 2 (step 230 or 240), among other things. If the answer is yes, the CDU 3 uses received energy consumption data to determine whether the battery 1 has sufficient capacity for future vehicle use (step 345). As part of this determination in step 345, the CDU 3 may also determine whether the battery 1 is charged according to the charge instructions. That is, CDU 3 may check the voltage level of battery 1 to determine if it is within an acceptable range of the expected voltage following the intended charge. If the answer is no, the CDU 3 outputs instructions to the offsite central computer 7 and/or display 8 to alert the operator that the battery 1 needs to be replaced (step 350). If the answer is yes, the CDU 3 creates an actual energy consumption profile (step 355).

Finally, the CDU 3 outputs any and all energy consumption data and energy consumption profile information it has to the central offsite computer 7. This allows for an operator to access this information and to review it, for example by using a software program resident on either the CDU 3 or on the central offsite computer 7. The software program can use the information to generate a wealth of useful information to the operator, such as a predicted end of battery life (e.g., how many charge cycles remain in the battery, the date when the battery will need replacement based on the expected usage of the vehicle, whether the battery has sufficient charge capacity to power the expected uses of the vehicle), vehicle usage statistics, charger malfunction, maintenance reminders, alerts that the battery 1 was not charged, and the like. In situations where the software program determines that the battery has insufficient charge capacity to power expected uses of the vehicle, the software program may be used to determine if the battery has sufficient charge capacity for another deployment. Thus, the software program may calculate how many charge cycles remain that will provide the battery with sufficient capacity to handle the current task. For Lithium Ion Batteries (and other chemistries with relatively linear capacity loss), the software program may be used to determine other deployments, such as other vehicles, where less charge capacity is required. That is, the software program may assist a company in transferring its batteries to, for instance, other vehicles that have lower energy load requirements between each charge cycle. Such information may be used to extend the battery's useful life beyond a single deployment of the battery. The offsite computer can also be in communication with an operator's cell phone, PDA, personal computer or the like, so that alerts can be sent directly to the operator.

In the foregoing detailed description, the invention has been described with reference to specific embodiments. However, it can be appreciated that various modifications and changes can be made without departing from the scope of the invention.

What is claimed is:

1. A battery-powered vehicle comprising:
   a vehicle battery;
   a battery charger capable of charging batteries of differing chemistries;
   a vehicle electrical load; and
   a central data unit (CDU) in communication with the vehicle battery, the battery charger, and the vehicle electrical load, wherein the CDU:
   receives battery identification data, including the chemistry type of the vehicle battery;
   receives energy consumption data from the vehicle battery;
   uses the battery identification data and energy consumption data to generate charging instructions for the battery charger; and
   outputs the charging instructions to the battery charger.

2. The vehicle of claim 1, wherein the vehicle battery is a lithium-ion battery and the CDU outputs charging instructions to the battery charger that prompts the battery charger to charge the lithium-ion battery to a set charge level that is not a full charge level.

3. The vehicle of claim 2, wherein the charging instructions also prompt the battery charger to begin charging the lithium-ion battery before a set time point, the set time point being a time point that allows the battery charger to complete charging before a next expected use of the vehicle.

4. The vehicle of claim 1, wherein the vehicle battery is not a lithium-ion battery and the CDU outputs charging instructions to the battery charger that prompts the battery charger to charge the vehicle battery to a full charge level.

5. The vehicle of claim 1, wherein the battery includes an RFID a Radio-Frequency Identifier (RFID) tag that stores the battery identification data, and the CDU is in communication with and receives the battery identification data from the RFID tag.

6. The vehicle of claim 1, wherein the CDU receives the battery identification data from the battery.

7. A vehicle battery maintenance system comprising:
   a battery charger; and
   a central data unit (CDU), wherein the CDU is in communication with the battery charger and is configured to gather data from an existing vehicle battery and an existing vehicle electrical load; and
   wherein the CDU:
   collects energy consumption data from the existing vehicle battery;
   maintains a clock and a calendar;
   creates an energy consumption profile for the vehicle by tracking the energy consumption data over a time period of use, the timing of the use, and the date of use of the vehicle;
   predicts the amount of energy needed by the battery during a subsequent use of the vehicle based on the energy consumption profile;
   uses the energy consumption data and the prediction of the amount of energy needed to generate charging instructions for the battery charger; and
   outputs the charging instructions to the battery charger.

8. The vehicle battery maintenance system of claim 7, wherein the charging instructions also prompt the battery charger to begin charging the battery before a set time point, the set time point being a time point that allows the battery charger to complete charging before a next expected use of the vehicle.

9. The vehicle battery maintenance system of claim 7, wherein the vehicle battery is a lithium-ion battery and the CDU outputs charging instructions to the battery charger that prompts the battery charger to charge the lithium-ion battery to a set charge level that is not a full charge level.

10. The vehicle battery maintenance system of claim 7, further comprising a water pump and water reservoir in communication with the CDU, wherein the CDU instructs the water pump to pump water from the water reservoir to the battery.

11. The vehicle battery maintenance system of claim 10, wherein the CDU instructs the water pump to pump water from the water reservoir to the battery at a set time point.

12. A battery-powered vehicle comprising:
    a vehicle battery;
    a vehicle electrical load;
    a vehicle controller that controls the vehicle electrical load;
    a battery charger;
    a central data unit (CDU) in communication with the vehicle battery, the battery charger, and the vehicle electrical load, wherein the CDU:
    collects energy consumption data from the vehicle battery indicating the amount of energy being drawn by the vehicle electrical load;
    creates an energy consumption profile for the vehicle by tracking the energy consumption data over a time period of use of the vehicle;
    predicts the amount of energy needed from the battery based on the energy consumption profile;

determines if the vehicle electrical load is consuming too much energy based on prediction of the amount of energy needed from the battery;

generates instructions to the vehicle controller to limit the energy consumption by the vehicle electrical load; and outputs the instructions to the vehicle controller.

13. The vehicle of claim 12, wherein the vehicle electrical load includes a motor and a vehicle controller, wherein the CDU:

receives operation data from the motor;

uses the operation data and the energy consumption data to generate instructions for the vehicle controller; and outputs instructions to the vehicle controller.

14. The vehicle of claim 13, wherein the energy consumption profile corresponds to the down-pressure of a scrubber brush of the vehicle.

15. The vehicle of claim 14, wherein the CDU generates instructions to limit the energy consumption by the scrubber brush of the vehicle if the down-pressure is set too high.

16. The vehicle of claim 12, wherein the vehicle electrical load is a scrubber brush motor of the vehicle.

17. A vehicle battery maintenance system comprising:
a battery charger; and
an offsite central computer; and
a central data unit (CDU), wherein the CDU is in communication with the battery charger and the offsite central computer, the CDU being configured to be placed in communication with an existing vehicle battery and an existing vehicle electrical load; and
wherein the CDU:
receives energy consumption data from the existing vehicle battery;
uses the energy consumption data to generate charging instructions for the battery charger;
outputs the charging instructions to the battery charger;
monitors whether the battery charger follows the charging instructions;
analyzes whether the existing vehicle battery has been charged; and
notifies the offsite central computer if the battery has not been charged following the charging instructions.

18. The battery maintenance system of claim 17, wherein the CDU receives charging algorithms from the offsite central computer.

19. The battery maintenance system of claim 18, wherein the CDU receives the charging algorithms from the offsite central computer when the battery charger is connected to the existing vehicle battery.

20. A vehicle battery maintenance system comprising:
a battery charger; and
an offsite central computer; and
a central data unit (CDU), wherein the CDU is in communication with the battery charger and the offsite central computer, the CDU being configured to be placed in communication with an existing vehicle battery; and
wherein the CDU:
collects energy consumption data from the existing vehicle battery;
uses the energy consumption data to generate charging instructions for the battery charger;
outputs the charging instructions to the battery charger;
provides the offsite central computer with the energy consumption data and the charging instructions; and
wherein one of the CDU and the offsite central computer determine the charge capacity remaining in the existing vehicle battery based on the energy consumption data and the charging instructions.

21. The vehicle battery maintenance system of claim 20, wherein the CDU outputs an alert that the battery needs replacement based on the determined charge capacity remaining in the battery.

* * * * *